J. Habermehl.
Fire Backs for Grates & Stoves.
Nº 71297. Patented Nov. 26, 1867.

Witnesses
James McBride
N Voegtly

Inventor
John Habermehl

United States Patent Office.

JOHN HABERMEHL, OF WHEELING, WEST VIRGINIA.

Letters Patent No. 71,297, dated November 26, 1867.

IMPROVED FIRE-BACKS FOR GRATES AND STOVES.

*The Schedule referred to in these Letters Patent and making part of the same.*

TO ALL WHOM IT MAY CONCERN:

Be it known that I, JOHN HABERMEHL, of Wheeling, West Virginia, have invented new and useful Improvements in the Making of Fire-Backs for the use of Fire-Grates and Stoves; and I do hereby declare that the following is a full, clear, and exact description thereof, which will enable others skilled in the art to make and use the same, reference being had to the accompanying drawing, forming part of this specification.

This invention consists in an improved manner of making fire-backs of tile, for grates and open fireplaces, in such a way that the same will stand the action of heat without being injured; and this may be done in two ways:

Firstly, the fire-back may be made in one whole entire piece, and yet stand the action of heat without breaking, by reason of being cut in grooves or creases, and leaving parts uncut sufficient to make the tile hold together, being still strong enough for transportation and handling.

Secondly, this invention consists also in making concave fire-backs in separate sections, each so formed that a number of them will make a concave fire-back, and form a complete arch.

Figure 2:
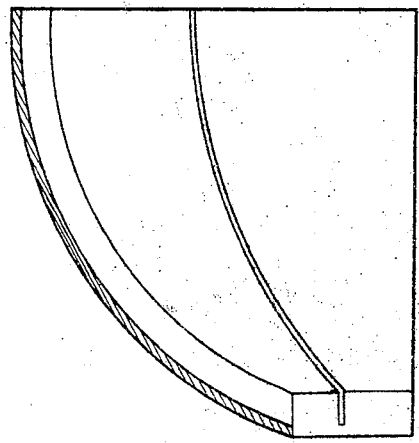
Figure 2 is rather a side view of a section, and also showing how deep the tile may be cut when the same is made in one whole piece.

In making fire-tile in one piece, and more in particular the concave fire-back, they will crack by the action of heat; but if the tile be cut in sections, partly through, as shown in fig. 2, this groove or crease will give room for contraction and expansion, and should the tile crack, it will follow those grooves, and they being in the form of an arch, the tile, when driven apart by heat, will come back to its true position again.

Figure 1:
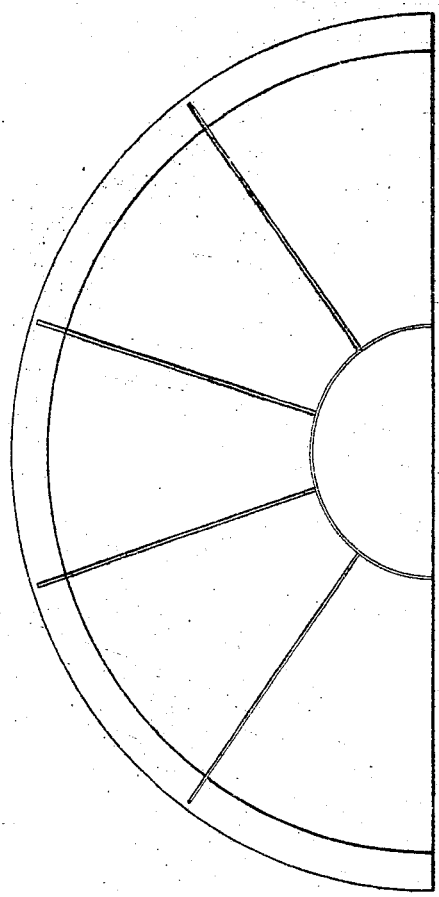
Figure 1 is a front view of my invention, showing the manner in which the tile may be cut when it is made in one whole piece, and also, when the tile is made in separate sections, how they all point to one centre.

A concave fire-back, when made of brick not so formed as to form an arch, all pointing to one centre, will fall apart by the expansion of heat; but when the sections are so formed as to make a complete arch, as shown in fig. 1, they will come back by their own weight when driven apart by the action of heat. It may be observed that the sections do not only point to one centre at their small ends, but also at their large ends, by which means they form a complete concave fire-back.

When a tile is made in one piece, and cut partly through, in manner named, I do not limit myself alone to a concave tile; other tile may likewise be cut in this manner. I do not limit myself how deep, or to what extent the cut shall be. In making concave fire-tile out of separate sections, I do not limit myself to its precise form; the sections may be so placed as to form the old concave fire-back, with a throat in the middle, or with an elliptical throat, and instead of the sections forming a quarter section of a hollow sphere, as shown in fig. 1, they may be placed so as to form a half section of a sphere.

I claim as new, and desire to secure by Letters Patent—

1. The fire-back of an open grate or fireplace, constructed of a fire-tile, grooved or cut partly through, for the purpose of withstanding the action of heat, in manner as herein described.

2. A concave fire-back, constructed of fire-tile in sections, so formed as to point to one centre, to resist the expansion by heat, as herein described.

JOHN HABERMEHL.

Witnesses:
N. VOEGTLY, Jr.,
HENRY W. FRIEDERICHS.